(12) United States Patent
Igarashi et al.

(10) Patent No.: US 7,590,888 B2
(45) Date of Patent: Sep. 15, 2009

(54) RECEIVING DEVICE AND TRANSMITTING DEVICE FOR DETERMINING ERRORS IN TRANSMISSION

(75) Inventors: Ken Igarashi, Yokohama (JP); Harunobu Fukazawa, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 378 days.

(21) Appl. No.: 10/846,125

(22) Filed: May 14, 2004

(65) Prior Publication Data

US 2005/0039075 A1 Feb. 17, 2005

(30) Foreign Application Priority Data

May 16, 2003 (JP) ............................. 2003-139385

(51) Int. Cl.
*G06F 11/00* (2006.01)
(52) U.S. Cl. .................... 714/18; 714/748; 370/230; 370/294
(58) Field of Classification Search .................. 714/18, 714/748
See application file for complete search history.

(56) References Cited

U.S. PATENT DOCUMENTS

| | | | | |
|---|---|---|---|---|
| 4,726,027 | A * | 2/1988 | Nakamura et al. | 714/748 |
| 6,292,470 | B1 * | 9/2001 | Uota | 370/252 |
| 6,581,176 | B1 * | 6/2003 | Seo | 714/749 |
| 6,909,718 | B1 * | 6/2005 | Aramaki et al. | 370/394 |
| 2001/0052072 | A1 | 12/2001 | Jung | |
| 2002/0038441 | A1 * | 3/2002 | Eguchi et al. | 714/748 |
| 2002/0145976 | A1 | 10/2002 | Meyer et al. | |
| 2002/0174395 | A1 * | 11/2002 | Chen et al. | 714/748 |
| 2003/0126238 | A1 * | 7/2003 | Kohno et al. | 709/220 |
| 2004/0243901 | A1 * | 12/2004 | Wang | 714/746 |
| 2005/0013246 | A1 * | 1/2005 | Miyake et al. | 370/230 |
| 2006/0129693 | A1 * | 6/2006 | LeCroy et al. | 709/231 |

FOREIGN PATENT DOCUMENTS

| | | |
|---|---|---|
| EP | 1 168 722 A1 | 1/2002 |
| JP | 10-247901 A | 9/1998 |
| JP | 2000-78195 A | 3/2000 |
| JP | 2001-168907 A | 6/2001 |
| WO | WO 00/62466 A2 | 10/2000 |

OTHER PUBLICATIONS

Stevens, W., "TCP Slow Start, Congestion Avoidance, Fast Retransmit, and Fast Recovery Algorithms" *Network Working Group*, Jan. 1997, 3 pages.

(Continued)

*Primary Examiner*—Emerson C Puente
(74) *Attorney, Agent, or Firm*—Brinks Hofer Gilson and Lione (57) ABSTRACT

A receiving device which received segments out of sequence identifies a lost segment among the segments to be received successively and transmits an acknowledgement including the number of lost segments as an advertised window size. By substituting either one of a transmitting device or a receiving device included in a communication system with a transmitting device or a receiving device of the present invention, a segment retransmission method according to the present invention is achieved. The present invention thus allows a conventional communication system to perform the lost segment retransmission of the present invention.

12 Claims, 5 Drawing Sheets

OTHER PUBLICATIONS

Floyd, S. et al., "The NewReno Modification to TCP's Fast Recovery Algorithm" *Network Working Group*, Apr. 1999, 6 pages.

Igarashi, K. et al., "Adoption of Delayed ACK for TCP in Wireless Environments" *Technical Report of IEICE, The Institute of Electronics, Information and Communication Engineers*, Nov. 14, 2002, pp. 49-54.

Takeshita et al., "Mastering TCP/IP: Introduction Edition", 3rd Edition, Feb. 25, 2002, pp. 189-205 (with translation).

Japanese Office Action issued Jul. 1, 2008 in Japanese patent application No. 2003-139385 (with translation).

* cited by examiner

RECEIVING DEVICE AND TRANSMITTING DEVICE FOR DETERMINING ERRORS IN TRANSMISSION

This application claims priority under 35 U.S.C. §119 to Japanese Patent Application No. 2003-139385 filed May 16, 2003, the entire content of which is hereby incorporated by reference.

TECHNICAL FIELD

The present invention relates to a technique for retransmitting a lost segment during data communication.

BACKGROUND ART

Terminal devices utilizing TCP (Transmission Control Protocol) for sending and receiving data, such as mobile telephones or personal computer devices having data communication functions are in widespread use. TCP is a type of communications protocol in the transport layer of an OSI reference model, and is used for achieving highly reliable communications. Under TCP, to ensure reliable communication, when a segment transmitted from a transmitting device is not received by a receiving device, it is retransmitted. A segment is a data block which includes a sequence of numbers indicating when it was transmitted from a transmitting device relative to other segments (hereinafter, referred to as "sequence number"). Hereinafter, the condition in which a segment transmitted from a transmitting device is not received by a receiving device will be referred to as "segment loss".

A transmitting device for transmitting segments using TCP detects a segment loss on the basis of the following two conditions. The first condition is to determine whether, after a predetermined period of time (hereinafter referred to as "retransmission timeout interval") has elapsed, a signal acknowledging receipt of the originally transmitted segment is received from a receiving device. In a case that an acknowledgement is not received during the retransmission timeout interval, the transmitting device determines that a segment loss has occurred and retransmits the segment. The retransmission of a segment on the basis of the first condition will be referred to as "retransmission caused by timeout". The second condition is to determine whether a predetermined number of (for example, three) duplicate acknowledgements are sent from a receiving device. A duplicate acknowledgement is transmitted from a receiving device to notify a transmitting device of a sequence number of a segment which it expects to receive, when segments are not received in an expected order. If a transmitting device receives duplicate acknowledgements within a predetermined time, the transmitting device determines that a segment loss has occurred and immediately retransmits the segment indicated by the duplicate acknowledgements without waiting for a retransmission timeout interval to elapse. A retransmission in accordance with the second condition is referred to as "fast retransmission".

In communications conducted under TCP, as described above, a transmitting device detects a segment loss and retransmits the lost segment. Further, when a segment loss is detected, congestion control for avoiding transmission of a large amount of segments to a network and flow control for avoiding the transmission of segments in such a volume as to exceed the buffer capacity of a receiving device are performed. The flow control and the congestion control will be described in detail later.

Figure 8:
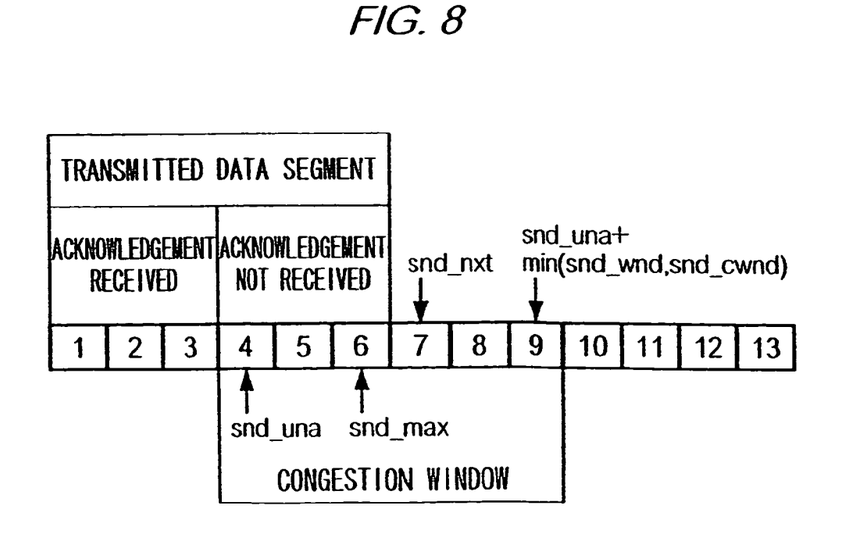
FIG. 8 is a diagram for explaining a congestion window using TCP.

A transmitting device using TCP to send a segment stores five parameters, snd_max, snd_nxt, snd_una, snd_wnd, and snd_cwnd. Congestion control is performed by transmitting a number of segments identified on the basis of those parameters. FIG. 8 is a diagram illustrating the interrelations of these five parameters. snd_max shows a sequence number (for example, sequence number "6" in FIG. 8) of a segment including the highest sequence number of segments that have already been transmitted. snd_nxt shows a sequence number (for example, sequence number "7" in FIG. 8) of a segment to be transmitted or retransmitted next. snd_una shows the lowest sequence number (for example, sequence number "4" in FIG. 8) of segments whose acknowledgement is not received. snd_cwnd shows bytes representing a number of data segments that may be transmitted by the transmitting device without an acknowledgement for previously transmitted segments being received. A segment transmitted by a transmitting device within a round trip time is shown between snd_una and snd_una+min (snd_wnd, and snd_cwnd) in FIG. 8. snd_wnd represents an advertised window size notified by a receiving device, and the value of the advertised window size indicates an available receiving buffer space in a receiving device, and is represented in bytes. A round trip time is a time necessary for a transmitting device to transmit a segment and receive an acknowledgement for the segment. The number of segments to be transmitted in a round trip time is indicated by a "congestion window size". A congestion window size thus computed never exceeds snd_wnd (an advertised window size); accordingly, a number of data segments transmitted to a receiving device never exceeds available buffer space in the receiving device. A transmitting device using TCP performs flow control by adjusting the number of transmitted segments; the segments being transmitted on the basis of an advertised window size.

A transmitting device performs congestion control by updating congestion window size snd_cwnd to an appropriate value. Congestion control performed by the transmitting device will now be explained. snd_cwnd represents a maximum segment size as an initial value. One data segment is represented by a unit called Maximum Segment Size (hereinafter referred to as "MSS"), where the default size of 1 MSS is determined as 512 bytes; and snd_cwnd has, for example, 1 MSS as its initial value. Each time an acknowledgement for a transmitted segment is received, the transmitting device increases a value of snd_cwnd in accordance with a slow start algorithm (R. W. Stevens. TCP Slow Start, Congestion Avoidance, Fast Recovery Algorithms. RFC2001, January 1997.; non-patent document 1) where a number of data segments transmitted is incremented exponentially, 1MSS, 2MSS, 4MSS, and 8 MSS, until the value reaches a predetermined threshold (e.g., 65,535 bytes). When the value of snd_cwnd reaches the threshold, the transmitting device increases the value of snd_cwnd by 1MSS. This process occurs each time a round trip time lapses until a segment loss is detected.

When detecting a retransmission timeout, the transmitting device updates the threshold at half of the value of the congestion window size and then set the value of snd_cwnd to 1 MSS. The transmitting device then rewrites snd_nxt to snd_una and starts retransmission from a segment indicated by snd_nxt, and increases the value represented by snd_cwnd using the above described slow start algorithm, each time receiving an acknowledgement for the retransmitted segment.

TCP typically performs the above explained operations, segment retransmission, congestion control, and flow control, when transmitting a segment. Some other techniques to improve efficiency in communication using TCP have been proposed (for example, Japanese patent laid-open publication No. 2000-78195; patent document 1, S. Floyd and et al. The New-Reno Modification to TCP's Fast Recovery Algorithm. RFC2582, April 1999.; non-patent document 2, and K. Igarashi et al. Adoption of Delayed ACK for TCP in Wireless Environments. Shingaku Gihou IN2002-111, 2002; non-patent document 3).

Patent document 1 discloses a technique for achieving efficient data transmission using a communication conforming to a TCP version called Reno supporting a SACK option (hereinafter referred to as "Reno-TCP"). SACK option is information for notifying a transmitting device of a segment received by a receiving device after a segment loss occurs. According to a technique described in patent document 1, in a case that a packet loss is notified by SACK information included in a received packet, a transmitting device immediately retransmits the lost packet only when the value set in snd_cwnd is lower than a predetermined threshold. By such a technique, erroneous retransmission caused by transposition of packet order is suppressed and efficient data transmission in communications conforming to Reno-TCP is achieved even under conditions where packet loss frequently occurs.

A TCP version called NewReno (hereinafter, referred to as "NewReno-TCP ") is disclosed in non-patent document 2. A transmitting device transmitting a segment using NewReno-TCP performs the above described fast retransmission and retransmits a lost segment using an algorithm called fast recovery. In a case that a transmitting device operates using a fast recovery algorithm, the number of segments retransmitted within one round-trip time is limited to "1". This is because, a segment already received by a receiving device should not be retransmitted. To cope with a situation in which several segments are lost, the transmitting device continues retransmission of a segment using a fast recovery algorithm until receiving an acknowledgement for a segment having a maximum sequence number among the previously transmitted segments. This is because, in a case that several segments are lost, a receiving device does not transmit an acknowledgement for a segment having a maximum sequence number until the receiving device receives all segments.

Non-patent document 3 discloses a technique for efficiently retransmitting a lost segment as a result of switching over of an access router at a receiving device (hereinafter, referred to as "handover") in a communication using mobile IP. Specifically, according to the technique disclosed in non-patent document 3, in a case that a segment loss occurs as a result of handover, a receiving device transmits to a transmitting device an acknowledgement with "0" set as the above-described advertised window size, thereby notifying the transmitting device that a segment loss has occurred as a result of handover. On receiving the acknowledgement, the transmitting device suspends clocking of retransmission timeout interval for a transmitted segment, and for the transmitted segments for which the transmitting device has not received an acknowledgement, determines that the segment loss is caused by insufficient buffer space in receiving device (hereinafter, such a state of a transmitting device is called "Persistent State").

The transmitting device then updates the above described snd_nxt to snd_una and retransmits a segment determined to be lost. When receiving from the receiving device an acknowledgement indicating the cancellation of Persistent State (specifically, an acknowledgement indicating that the value of advertised window size is other than "0"), the transmitting device ends the above described Persistent State and restarts transmitting a segment represented by snd_nxt.

Figure 9:
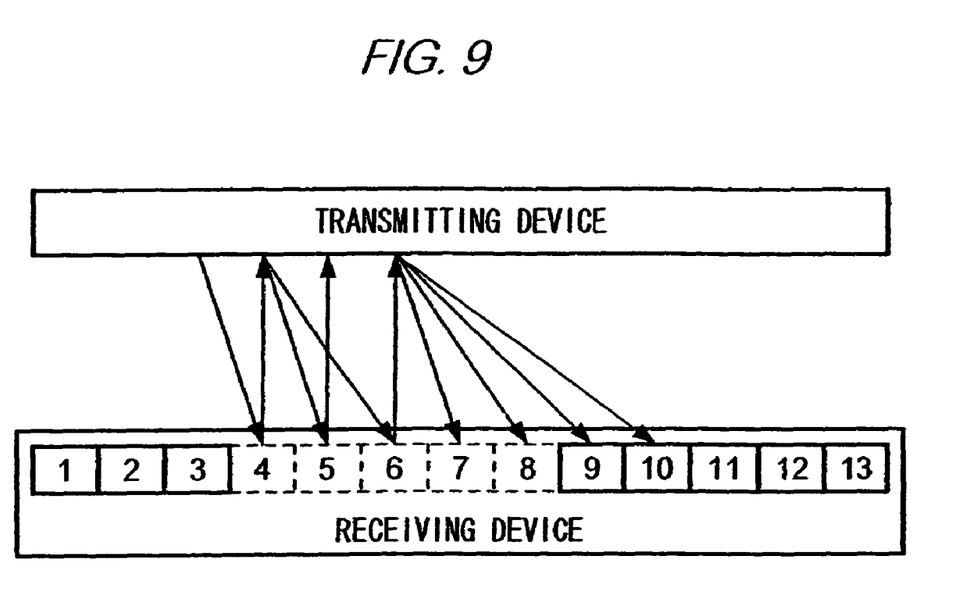
FIG. 9 is a diagram showing one example of a communication sequence on timeout using TCP.

The significant problem in the technique described in non-patent document 2 is that because of the segment retransmission in response to a retransmission timeout, a throughput in an overall communication system is likely to decrease. As shown in FIG. 9, for example, a transmitting device is assumed to transmit 12 segments among which the fourth to eighth segments are lost; the lost segments are retransmitted in response to retransmission timeout. The transmitting device executes the above described slow start algorithm to update the value represented by snd_cwnd, thereby starting the retransmission from the fourth segment. Specifically, the transmitting device firstly updates the value represented by snd_cwnd to 1MSS and retransmits only one segment, that is, the fourth segment. When receiving an acknowledgement for the fourth segment, the transmitting device updates the value represented by snd_cwnd to 2MSS and then retransmits the fifth and the sixth segment. When receiving an acknowledgement for the sixth segment, the transmitting device updates the value represented by snd_cwnd to 4MSS and then retransmits four segments, that is the seventh to tenth segments. Among the four segments, the ninth and the tenth segments are already received by the receiving device; the segments are not required to be retransmitted. According to this technique, however, a transmitting device cannot detect a segment already received by the receiving device; thus, segments which do not need to be retransmitted are also retransmitted. In this way, when a segment including a segment already received by the receiving device is transmitted, the receiving device transmits the above-described duplicate acknowledgement (in FIG. 9, a duplicate acknowledgement requiring the retransmission of the thirteenth segment). In response to receiving an acknowledgement for the seventh segment (an acknowledgement requiring the transmission of the eighth segment), the transmitting device further transmits the eleventh to eighteenth segments. As a result, the receiving device transmits a duplicate acknowledgement for three segments including the ninth to eleventh segments indicating the transmission of the thirteenth segment. In the subsequent. process, the transmitting device receives three duplicate acknowledgements requiring the transmission of the thirteenth segment, and mistakenly retransmits the thirteenth segment.

According to the technique disclosed in non-patent document 3, in a case of receiving an acknowledgement with "0" set as advertised window size, among the transmitted segments, every segment for which an acknowledgement has not been received is considered to be lost and retransmission is performed. In actuality, however, not all of the segments are lost. For this reason, the problem of the technique disclosed in the non-patent document 3 is that the retransmission of a segment causes a decrease in throughput in an overall communication system.

The explained problems, according to the techniques disclosed in both the non-patent document 2 and the non-patent document 3, are caused because a transmitting device is not able to detect a segment received normally by a receiving device after a segment loss occurs. According to the technique disclosed in patent document 1, a transmitting device is able to detect an already received segment by referring to SACK OPTION. However, the technique disclosed in the patent document 1 cannot be directly applied to the non-patent documents, because the techniques disclosed in both the non-patent document 2 and non-patent document 3 are not supported on the basis of SACK OPTION.

The present invention has been presented to overcome the stated problems and has an object to provide a technique in which, at the time of transmitting a lost segment again to a transmitting device, a receiving device is prohibited from retransmitting an already received segment.

DISCLOSURE OF THE INVENTION

To solve the above stated problems, the present invention provides a receiving device comprising a receiving means for receiving a segment from a transmitting device transmitting a predetermined number of successive segments, a storage means for storing sequence numbers included in segments received by the receiving means, a determining means for determining on the basis of the contents of the storage means whether the receiving means fails to receive a segment or a block of successive segments from among a plurality of successive segments transmitted by the transmitting device, a computing means for, in a case that the determining means determines that the receiving means has failed to receive a segment or a block of successive segments, computing the number of lost segments between the beginning and the end of the segment or block of successive segments which were not received, and a requiring means for requiring the retransmission of a segment or by notifying the transmitting device of a sequence number the first segment of a block of successive segments which were not received and the number of lost segments which were not received computed by the computing means.

To solve the stated problems, the present invention provides a program for causing a computer device to receive a segment from a transmitting device transmitting a predetermined number of successive segments, store sequence numbers included in segments received by the receiving means, determine on the basis of the contents of the storage means whether the receiving means fails to receive a segment or a block of successive segments from among a plurality of successive segments transmitted by the transmitting device, compute the number of lost segments between the beginning and the end of the segment or block of successive segments which were not received, in a case that the determining means determines that the receiving means has failed to receive a segment or a block of successive segments, and require the retransmission of a segment or by notifying the transmitting device of a sequence number the first segment of a block of successive segments which were not received and the number of lost segments which were not received computed by the computing means.

According to the receiving device and the program, an acknowledgement including a sequence number of a segment positioned at the beginning of the lost part and the number of lost segments as an advertised window size is transmitted to a transmitting device. The transmitting device which receives the acknowledgement only transmits a segment having a sequence number identified within the advertised window size among the sequence numbers included in the acknowledgement.

To solve the above stated problems, the present invention provides a receiving device comprising a receiving means for receiving from a receiving device an acknowledgement as a response to a segment transmitted from the transmitting device, a determining means for, in a case that the acknowledgement received by the receiving means is an acknowledgement for a lost segment, determining the validity of the acknowledgement, and a transmitting means for transmitting to the receiving device a segment identified by a sequence number included in the acknowledgement received by the receiving means only when the acknowledgment is determined to be valid by the determining means.

To solve the stated problems, the present invention provides a program for causing a computer device to receive from a receiving device an acknowledgement as a response to a segment transmitted from the transmitting device, determine the validity of the acknowledgement, in a case that the acknowledgement received by the receiving means is an acknowledgement for a lost segment, and transmit to the receiving device a segment identified by a sequence number included in the acknowledgement received by the receiving means only when the acknowledgment is determined to be valid by the determining means.

Such transmitting device and program transmit to a receiving device a segment indicated by the partial acknowledgement, only when a partial acknowledgement transmitted from a receiving device is valid.

DESCRIPTION OF THE PREFERRED EMBODIMENTS

Referring to the drawings, embodiments of the present invention will be explained.

A. First Embodiment (1: Configuration of a Communications System)

Figure 1:
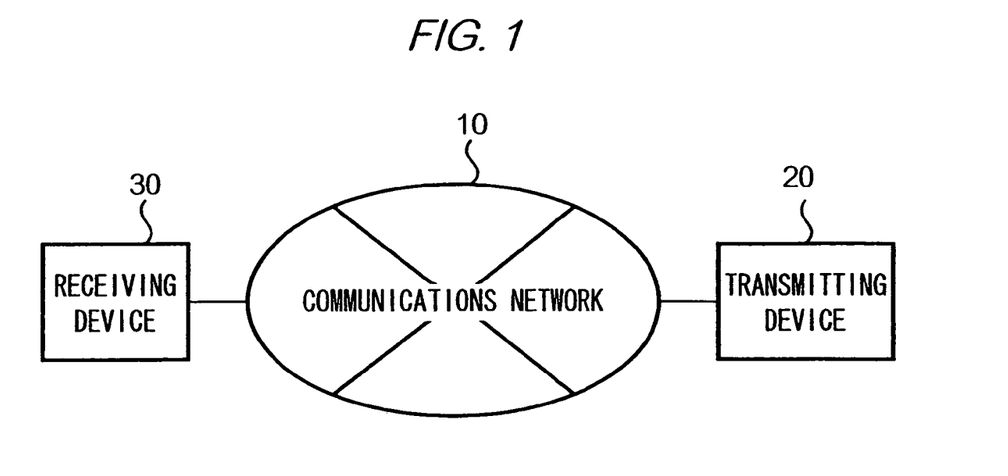
FIG. 1 is a configuration example of a communication system according to the first embodiment of the present invention.

FIG. 1 is a diagram showing one example of overall configuration of a communication system including a receiving device, according to one embodiment of the present invention. As shown in FIG. 1, the communication system comprises, for example, a communication network 10 such as LAN (Local Area Network), a transmitting device 20 connected to communication network 10, and a receiving device 30.

Transmitting device 20 is a typical computer device transmitting a segment using a NewReno-TCP. Namely, transmitting device 20 updates the five parameter variables on the basis of an acknowledgement received from receiving device 30, retransmits a lost segment, and performs congestion control and flow control.

Receiving device 30 designates a personal computer device that receives a segment using TCP. In a case of detecting a segment loss, receiving device 30 transmits an acknowledgement typical to the receiving device of the present invention to request transmitting device 20 to retransmit the lost segment. More specifically, in a case of detecting a segment loss, receiving device 30 transmits to transmitting device 20 an acknowledgement including a minimum sequence number of a lost segment and a value representing the number of lost segments as an advertised window size.

In a communication system of FIG. 1, when a loss of segment occurs, retransmission of a segment already received by receiving device 30 is avoided by notifying transmitting device 20 of the number of the lost segment in an advertised window size. In the present embodiment, a case is explained in which a personal computer device is used as one example of a receiving device according to the present embodiment. A receiving device is not limited to a computer device, and a mobile phone that communicates with transmitting device 20 using TCP can also be employed. In other words, any type of computer device that communicates with transmitting device 20 using TCP can be employed.

(2: Configuration of Receiving Device 30)

Figure 2:
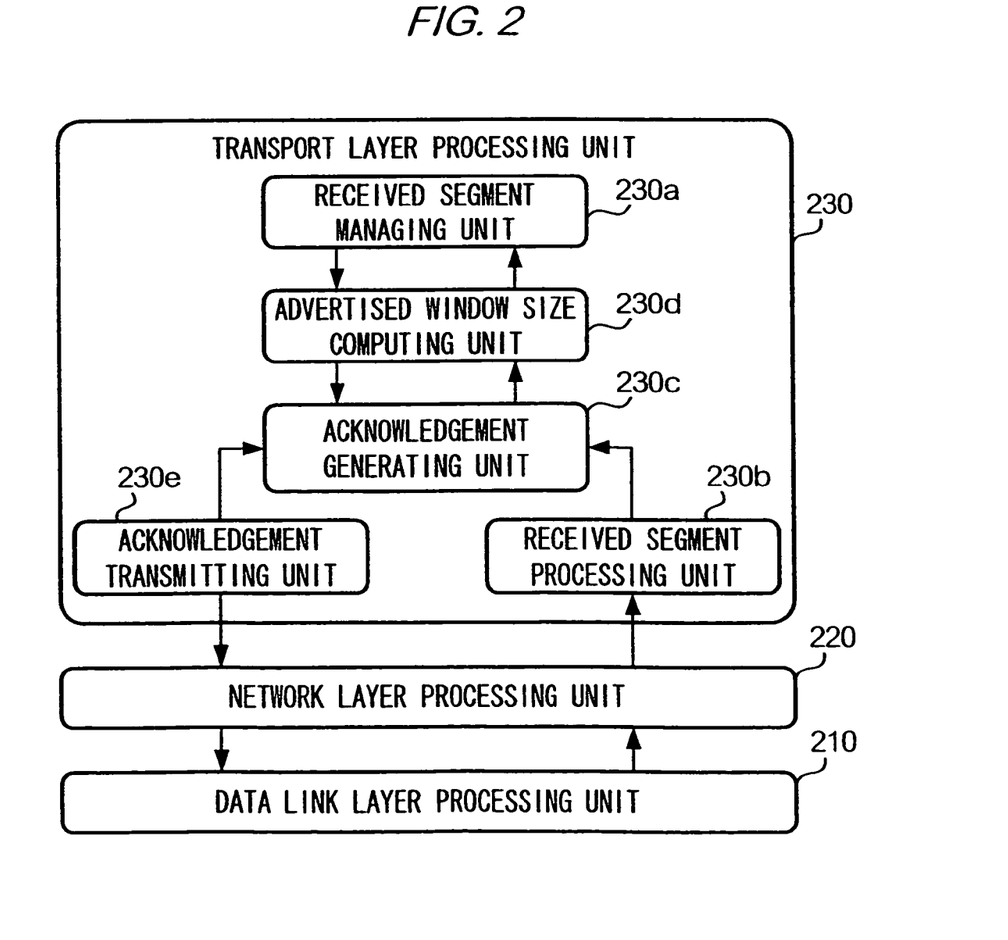
FIG. 2 is a block diagram showing a configuration example of receiving device 30.

Referring to FIG. 2, the function configuration of receiving device 30 will be explained. As shown in FIG. 2, receiving device 30 has a data link layer processing unit 210, a network layer processing unit 220, and a transport layer processing unit 230.

Data link layer processing unit 210 passes a frame received over communications network 10 to network layer processing unit 220 after it is subjected to a packet conversion. Data link layer processing unit 210 also passes a packet received from network layer processing unit 220 to communications network 10 after it is subjected to a frame conversion. It is to be noted that, a packet is a data block in communications unit at a network layer; the packet includes the above described segment and a packet header. A frame refers to a data block in communications unit at a data link layer; the frame includes the above described packet and a frame header.

Network layer processing unit 220 converts a packet passed from data link layer processing unit 210 into a segment and transmits the segment to transport layer processing unit 230. Network layer processing unit 220 also converts a segment passed from transport layer processing unit 230 into a packet and transmits the packet to data link layer processing unit 210.

As shown in FIG. 2, transport layer processing unit 230 has a received segment managing unit 230a, a received segment processing unit 230b, an acknowledgement generating unit 230c, an advertised window size computing unit 230d, and an acknowledgement transmitting unit 230e.

Received segment managing unit 230a is used for storing a sequence number to identify a lost segment. In the present embodiment, an explanation for storing a sequence number of a lost segment in received segment managing unit 230a will given. The sequence number of a received segment may also be stored in received segment managing unit 230a. Consequently, a variety of methods may be used to identify a lost segment.

Received segment processing unit 230b analyzes a header of the segment passed from network layer processing unit 220 and determines whether a segment is lost. When the segment is determined to be lost, the loss processing unit stores a sequence number of the lost segment in received segment managing unit 230a. Further, received segment processing unit 230b requires acknowledgement generating unit 230c to generate an acknowledgement for a segment passed from network layer processing unit 220.

Acknowledgement generating unit 230c generates an acknowledgement for a segment processed at received segment processing unit 230b and passes the generated segment to an acknowledgement transmitting unit 230e. More particularly, acknowledgement generating unit 230c requests from advertised window size computing unit 230d a value of advertised window size to be written in the acknowledgement. The acknowledgement generating unit then generates a segment including an acknowledgement (hereinafter, referred to as an "acknowledgement segment"), in which the value passed from advertised window size computing unit 230d is written as an advertised window size.

Advertised window size computing unit 230d, the detailed function of which will be described below, is used for computing an advertised window size according to a flow chart shown in FIG. 4, and for passing the computed result to an acknowledgement generating unit 230c.

Acknowledgement transmitting unit 230e is used for passing an acknowledgement segment from acknowledgement generating unit 230c to network layer processing unit 220.

(3: Operations of Receiving Device 30)

Figure 3:
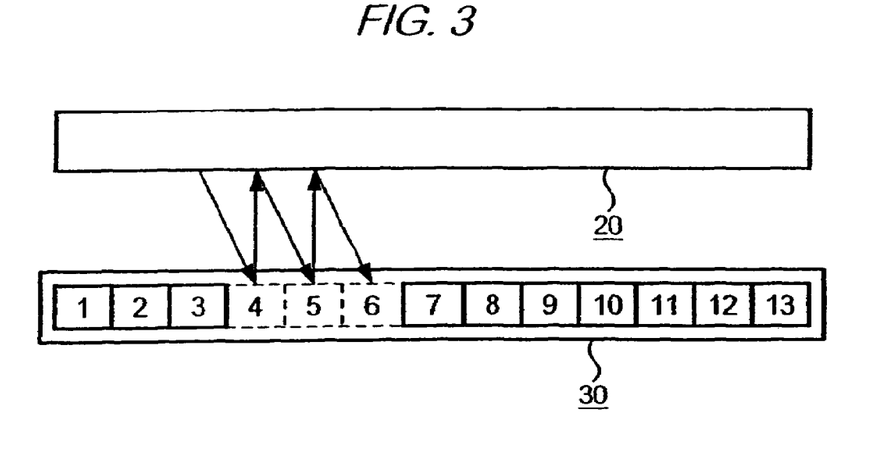
FIG. 3 is a diagram showing a segment retransmission sequence in a communication system.
Figure 4:
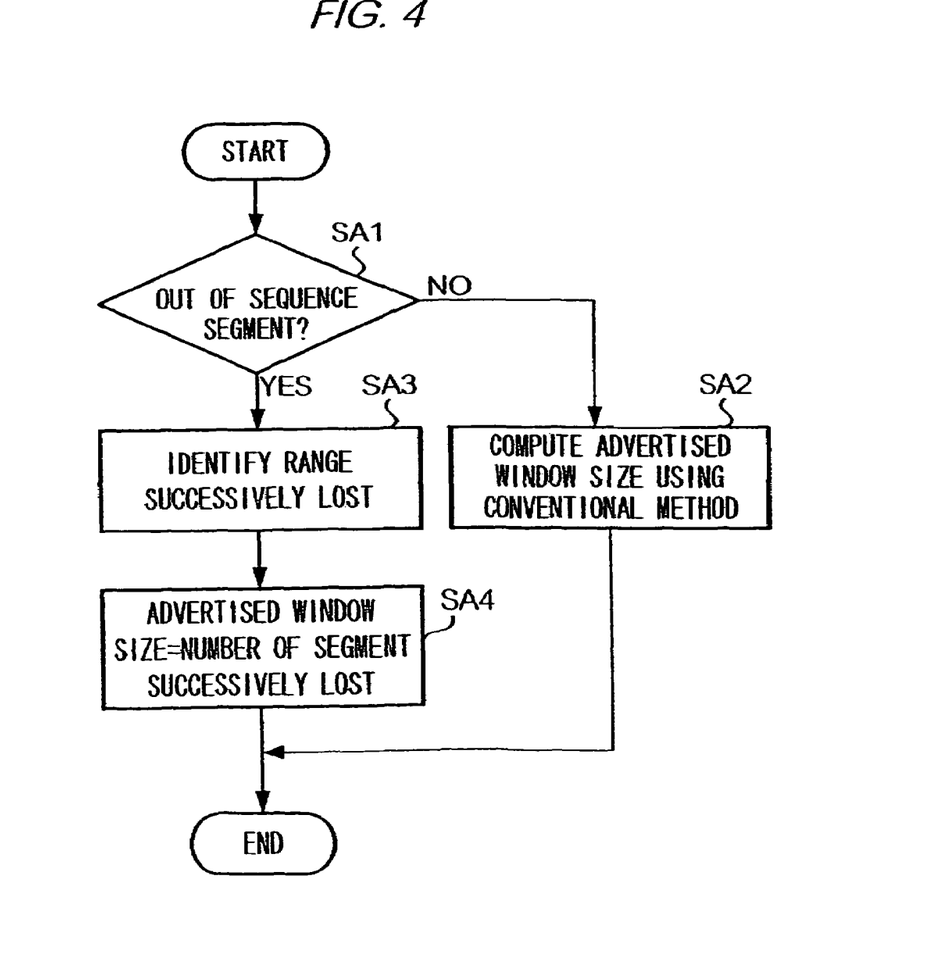
FIG. 4 is a flowchart showing the steps of operations performed by advertised window size computing unit 230$d$ of receiving device 30.

Referring to FIG. 4, in a case of receiving segments out of sequence, the operations of advertised window size computing unit 230d in receiving device 30 will be explained. For the sake of explanation of the present example, as shown in FIG. 3, it will be assumed: wherein, while transmitting 13 segments including a sequence number from 1 to 13 from transmitting device 20, three segments, the fourth to sixth segments are lost.

As shown in FIG. 3, among 13 segments from transmitting device 20, three segments including the fourth to sixth segments are lost and are not received by receiving device 30. Thus, no acknowledgement for the lost segments is transmitted, which is likely to cause a retransmission timeout. When a retransmission timeout occurs, transmitting device 20 firstly retransmits the fourth segment. When receiving the fourth segment, namely an out of sequence segment, advertised window size computing unit 230d of receiving device 30 computes an advertised window size in accordance with a flowchart shown in FIG. 4. In the present example, an explanation is given in which the transmitting device 20 retransmits the lost segment in response to a retransmission timeout. However, in another embodiment, receiving device 30 may detect a lost segment and notify the detection to transmitting device 20; the notification involving, for example, transmitting to transmitting device 20 an acknowledgement where the value of advertised window size is set to "0".

As shown in FIG. 4, advertised window size computing unit 230d firstly determines whether the received segment is an out of sequence segment(step SA1). Specifically, advertised window size computing unit 230d determines the received segment to be an out of sequence segment, only when a sequence number included in the received segment is stored in segment managing unit 230a.

In a case that the determination result in step SA1 is "No", advertised window size computing unit 230d computes an advertised window size on the basis of a conventional algorithm (for example, an available buffer space of received buffer) (step SA2). In a case that the determination result in step SA1 is "Yes", advertised window size computing unit 230d performs a later-described step SA3. In the present example, as shown in FIG. 3, a segment indicates a sequence number having a value of "4", is an out of sequence segment. Thus, the determination result in step SA1 is "Yes", and the operation proceeds to step SA3.

In step SA3 that follows step SA1, advertised window size computing unit 230d identifies the range of segments which are to be successively received. Specifically, the advertised window size computing unit identifies a sequence number indicating the beginning of segments which are to be successively received and the number of segments included within the range. Advertised window size computing unit 230d then notifies acknowledgement generating unit 230c the number of segments identified in step SA3 as an advertised window size (step SA4). In the present operation example, as shown in FIG. 3, "5" is identified as a sequence number of the initial segment within the range and "2" is identified as the number of lost segments. As a result, "2" is notified from advertised window size computing unit 230d to acknowledgement generating unit 230c as an advertised window size.

Acknowledgement generating unit 230c generates an acknowledgement including an advertised window size notified from advertised window size computing unit 230d, and instructs acknowledgement transmitting unit 230e to transmit a segment including the acknowledgement. In a case of receiving a segment having a sequence number "5", receiving device 30 transmits an acknowledgement including "1" as an advertised window size to transmitting device 20. In a case of receiving a segment having a sequence number "6", no lost segment exists. Therefore, the receiving device transmits to transmitting device 20 an acknowledgement including an advertised window size computed on the basis of a capacity of a received buffer.

B. Second Embodiment

Referring to the drawings, a communication system according to the second embodiment of the present invention will be explained.

(1: Configuration of Communication System)

Figure 5:
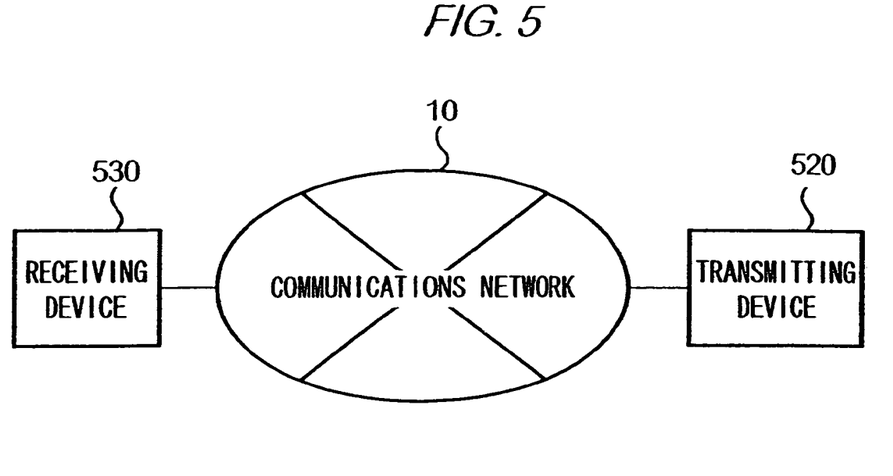
FIG. 5 is a diagram showing a configuration example of a communication system according to the second embodiment of the present invention.

FIG. 5 is a diagram showing an overall configuration of a communication system according to the second embodiment of the present invention. There are only two differences between the communication system shown in FIG. 5 and the communication system shown in FIG. 1; a transmitting device 520 is used for transmitting device 20 and a receiving device 530 is used for receiving device 30.

Receiving device 530 is a typical computer device notifying a loss, in a case that a segment loss occurs, by transmitting an acknowledgement where the value of advertised window size is set to "0".

Transmitting device 520, after receiving the acknowledgement having the value of advertised window size to "0", is designed not to transmit another segment having a sequence number larger than the sequence number represented by snd_max until it receives an acknowledgement other than the above-described partial acknowledgement.

Further, in a case of receiving a partial acknowledgement, transmitting device 520 determines the validity of the acknowledgement and transmits a segment indicated by the partial acknowledgement, only when the partial acknowledgement is determined to be valid.

As described above, in a communication system shown in FIG. 5, the retransmission of a segment already received by receiving device 530 is avoided as follows: transmitting device 520 transmits no other segments unless it receives a valid partial acknowledgement from receiving device 530; in other words, transmitting device 520 transmits no subsequent segments unless it receives a partial acknowledgement from receiving device 530 in response to receipt of a retransmitted segment.

(2: Configuration of Transmitting Device 520)

Figure 6:
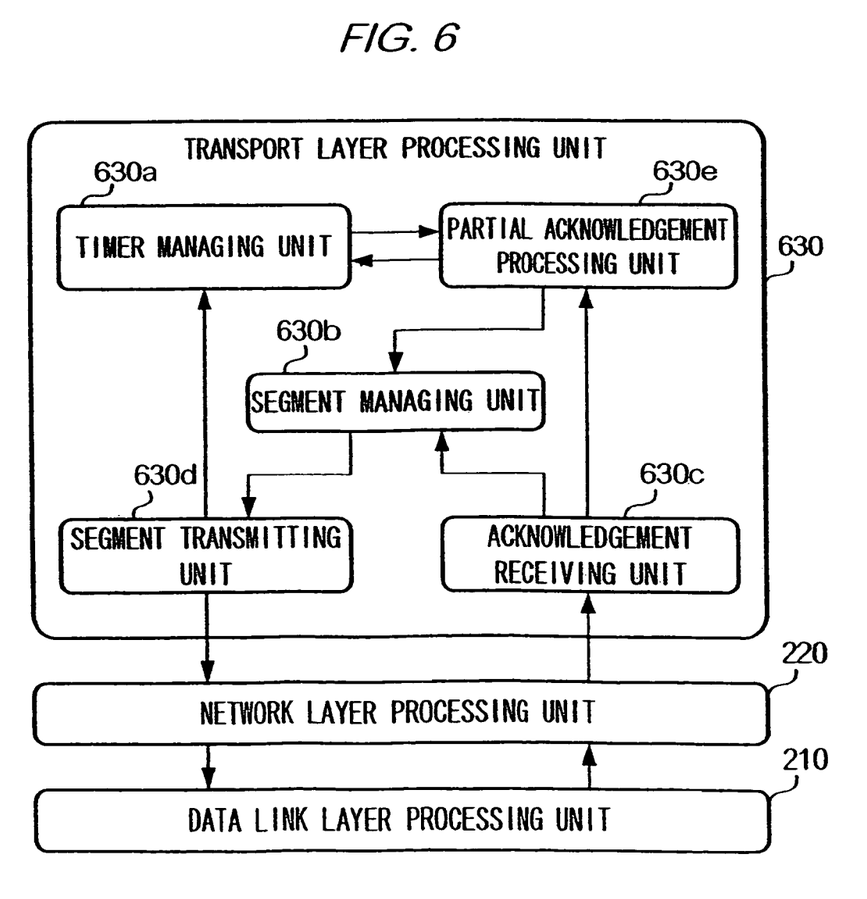
FIG. 6 is a block diagram showing a configuration example of transmitting device 520.

Referring to FIG. 6, one example of function configuration of transmitting device 520 will be explained. As shown in FIG. 6, the only difference in function configuration between transmitting device 520 and receiving device 30 is that the transmitting device has a transport layer processing unit 630 instead of transport layer processing unit 230. Transport layer processing unit 630, as shown in FIG. 6, has a timer managing unit 630a, a segment managing unit 630b, an acknowledgement receiving unit 630c, a segment transmitting unit 630d, and a partial acknowledgement processing unit 630e.

Timer managing unit 630a is equipped with a clocking function for clocking the time required to transmit a segment and receive the segment.

Segment managing unit 630b is used for managing a segment to be transmitted to receiving device 530. Specifically, segment managing unit 630b stores the above described five types of parameter variables.

Acknowledgement receiving unit 630c determines whether an acknowledgement included in an acknowledgement segment from network layer processing unit 220 is a partial acknowledgement. Specifically, acknowledgement receiving unit 630c determines an acknowledgement as a partial acknowledgement, in a case that a sequence number included in a segment received through a network layer processing unit 220 does not agree with a sequence number in snd_max. In a case of determining the recipient of an acknowledgement other than a partial acknowledgement, acknowledgement receiving unit 630c requests segment transmitting unit 630d to send a segment indicated by the acknowledgement. In a case of determining the recipient of a partial acknowledgement, acknowledgement receiving unit 630c requests acknowledgement processing unit 630e to process the partial acknowledgement.

Segment transmitting unit 630d, in response to the request from acknowledgement receiving unit 630c, passes a segment to network layer processing unit 220, thereby transmitting the segment to receiving device 530. When transmitting a lost segment again, segment transmitting unit 630d transmits the segment to receiving device 530 and requests the above described timer managing unit 630a to clock the time necessary to receive an acknowledgement for the segment.

Figure 7:
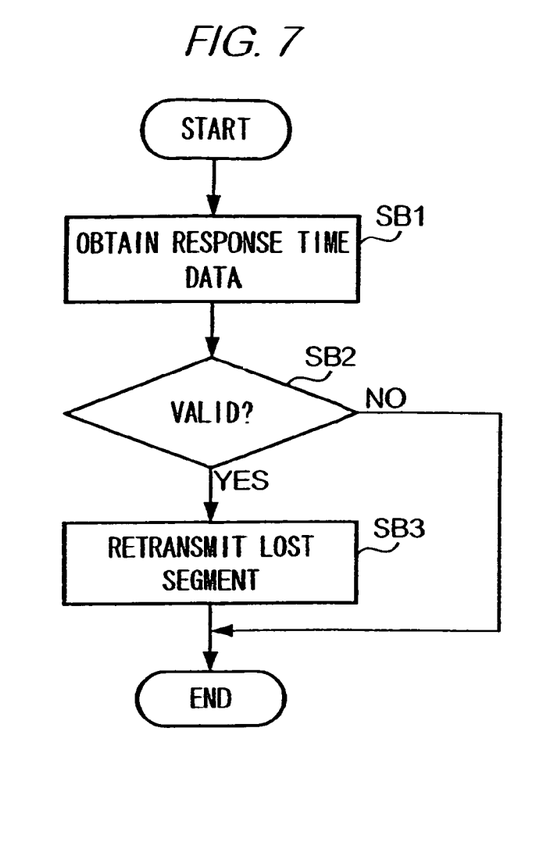
FIG. 7 is a flowchart showing the steps of operations performed by partial acknowledgement processing unit 630$e$ of transmitting device 520.

Partial acknowledgement processing unit 630e determines the validity of a received partial acknowledgement in accordance with the flowchart shown in FIG. 7. The partial acknowledgement processing unit transmits a segment using the above-described NewReno-TCP, only when a segment is determined to be valid.

(3: Operations of Transmitting Device 520)

Referring to FIG. 7, an explanation will be given of operations performed by partial acknowledgement processing unit 630e of transmitting device 520 in a case of receiving a partial acknowledgement for a retransmitted segment. As shown in FIG. 7, on receiving a partial acknowledgement, partial acknowledgement processing unit 630e obtains data indicating the time required to receive partial acknowledgement (hereinafter, referred to as "response time data") from timer managing unit 630a.

Partial acknowledgement processing unit 630e determines the validity of the partial acknowledgement on the basis of the response time data obtained at step SB1 (step SB2). Specifically, in a case that a time indicated by data obtained at step SB1 is shorter than a predetermined time (for example, one round trip time), partial acknowledgement processing unit 630e determines the partial acknowledgement to be invalid. In a case that a time indicated by data is longer than a predetermined time, the partial acknowledgement processing unit determines the partial acknowledgement to be valid. Partial acknowledgement processing unit 630e retransmits the lost segment only when the determination result at step SB2 is "Yes", using the above-described NewReno-TCP (step SB3).

C. Modifications

Embodiments of the present invention are described above. The present invention is not limited to the embodiments described and can be modified within the scope of its technical idea. Some examples of modifications are as follow:

(Modification Example 1) In the above-described first embodiment and second embodiment, both the receiving device and the transmitting device are assumed to be radio-connected to communications network 10. Conversely, the receiving device may be a mobile communications terminal communicating with a transmitting device using mobile IP over communications network 10. When applied to such a case, the present invention provides an outstanding effect. This is because, using mobile IP, during a handover process at a receiving device, for example, communication between a receiving device and a transmitting device is likely to cause a segment loss, compared to a case in which a receiving device and a transmitting device are radio-connected to a communication network.

(Modification Example 2) In the above-described first embodiment, an explanation is given with respect to a receiving device 30 of the present embodiment which enables preventing retransmission of a segment already received by receiving device 30. Conversely, a computer device may have the same function as a receiving device of the present invention, by having a typical computer device store and execute software for causing the computer device to achieve the functions specific to the receiving device of the present invention.

In the above-described second embodiment, an explanation is given with respect to a transmitting device 520 of the present embodiment which enables preventing retransmission of a segment already received by receiving device 530. Conversely, a computer device may have the same function as a transmitting device of the present invention, by having a typical computer device store and execute software for causing the computer device to achieve the functions specific to the transmitting device of the present invention.

Specifically, the above described software is stored in a computer device readable medium including such as a CD-ROM (Compact Disk-Read Only Memory) or an FD (Floppy Disk). The software stored in such storage medium is read by the computer device and stored. The computer device may have the same function as a receiving device or a transmitting device of the present invention, by having the computer device execute the software.

The invention claimed is:

1. A receiving device, comprising:
   receiving means for receiving a segment from a transmitting device transmitting a predetermined number of successive segments;
   storage means for storing sequence numbers included in segments received by said receiving means;
   determining means, in a case that said receiving means fails to receive a block of successive segments from among a plurality of successive segments transmitted by said transmitting device, for determining whether said receiving means receives a lost segment in said block of successive segments from said transmitting device;
   computing means for, if said determining means determines that said receiving means has received the lost segment from said transmitting device, computing a lost segment number, the lost segment number equaling a total number of consecutive lost segments between a segment subsequent to the lost segment received from the transmitting device and an end segment of said block of successive segments which were not received; and
   requiring means for requiring a retransmission of a segment by notifying said transmitting device of the lost segment number computed by said computing means.

2. The receiving device of claim 1, wherein the receiving device comprises a mobile telephone.

3. The receiving device of claim 1, wherein the receiving device comprises a mobile telephone.

4. The receiving device of claim 1, wherein the receiving device further comprises a congestion window size, the congestion window size indicating available buffer space for receiving a number of segments transmitted by the transmitting device; and
   wherein the receiving device recalculates the congestion window size based on whether a received segment is out of sequence.

5. The receiving device of claim 4, wherein the receiving device recalculates the congestion window size to be equal to the lost segment number.

6. The receiving device of claim 1, wherein the receiving device further comprises a congestion window size, the congestion window size indicating available buffer space for receiving a number of segments transmitted by the transmitting device; and
   wherein the lost segment number further being indicative to the transmitting device of the congestion window size of the receiving device.

7. A program stored in a computer readable medium for causing a computer device to perform functions, comprising:
   a receiving function for receiving a segment from a transmitting device transmitting a predetermined number of successive segments;
   a storing function for storing sequence numbers included in segments received as a result of executing said receiving function;
   a determining function, in a case that said receiving function fails to receive a block of successive segments from among a plurality of successive segments transmitted as a result of executing said transmitting device, for determining whether said receiving function receives a lost segment in said block of successive segments from said transmitting device;
   a computing function, if said determining function determines that said receiving function has received the lost segment from said transmitting device, for computing a lost segment number, the lost segment number equaling a total number of consecutive lost segments between a segment subsequent to the lost segment received from the transmitting device and an end segment of said block of successive segments which were not received, in a case that a receiving function for receiving a block of successive segments is determined to fail as a result of executing said determining function; and
   a requiring function for requiring a retransmission of a segment by notifying said transmitting device of the lost segment number computed as a result of executing said computing function.

8. The program of claim 7, wherein the computer device comprises a mobile telephone.

9. The program of claim 7, wherein the computer device comprises a mobile telephone.

10. The program of claim 7, further comprising a congestion window size function for determining an available buffer space for receiving a number of segments transmitted by the transmitting device; and wherein the congestion window size function recalculates the congestion window size based on whether a received segment is out of sequence.

11. The program of claim 10, wherein the congestion window size function recalculates the congestion window size to be equal to the lost segment number.

12. The program of claim 7, further comprising a congestion window size function for determining an available buffer space for receiving a number of segments transmitted by the transmitting device; and wherein the lost segment number further being indicative to the transmitting device of the congestion window size.

* * * * *

UNITED STATES PATENT AND TRADEMARK OFFICE
CERTIFICATE OF CORRECTION

PATENT NO. : 7,590,888 B2  Page 1 of 1
APPLICATION NO. : 10/846125
DATED : September 15, 2009
INVENTOR(S) : Igarashi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 665 days.

Signed and Sealed this

Twenty-first Day of September, 2010

David J. Kappos
*Director of the United States Patent and Trademark Office*